United States Patent
Tung et al.

(10) Patent No.: US 7,050,260 B1
(45) Date of Patent: May 23, 2006

(54) METHOD AND APPARATUS FOR PARTIAL SELF-SERVO WRITING USING SERVO WEDGE PROPAGATION

(75) Inventors: David M. Tung, Livermore, CA (US); Lin Guo, Milpitas, CA (US); Don Brunnett, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 188 days.

(21) Appl. No.: 10/293,904

(22) Filed: Nov. 12, 2002

Related U.S. Application Data

(60) Provisional application No. 60/345,889, filed on Nov. 9, 2001.

(51) Int. Cl.
*G11B 21/02* (2006.01)
(52) U.S. Cl. .......................................... 360/75
(58) Field of Classification Search ................. 360/75, 360/77.08, 78.04, 78.09, 78.14, 77.07, 77.04, 360/77.05, 77.03, 40, 63, 77.11, 51
See application file for complete search history.

(56) References Cited

U.S. PATENT DOCUMENTS

| | | | | |
|---|---|---|---|---|
| 4,598,327 A * | 7/1986 | Jen et al. | ................. | 360/77.07 |
| 4,819,095 A * | 4/1989 | Asano et al. | ............ | 360/77.04 |
| 5,079,654 A * | 1/1992 | Uno et al. | ................ | 360/78.14 |
| 5,095,393 A * | 3/1992 | Janz | ........................ | 360/77.05 |
| 5,196,970 A * | 3/1993 | Seko et al. | ............... | 360/77.03 |
| 5,600,499 A * | 2/1997 | Acosta et al. | ................. | 360/40 |
| 6,519,107 B1 | 2/2003 | Ehrlich et al. | ................ | 360/75 |
| 6,522,494 B1 | 2/2003 | Magee | ......................... | 360/75 |
| 6,687,073 B1 * | 2/2004 | Kupferman | .................. | 360/63 |
| 6,714,376 B1 * | 3/2004 | Brunnett et al. | .............. | 360/75 |
| 6,724,562 B1 * | 4/2004 | Ang et al. | ............... | 360/78.04 |
| 6,738,215 B1 * | 5/2004 | Yatsu | ........................... | 360/75 |
| 6,760,180 B1 * | 7/2004 | Kino et al. | .................. | 360/75 |
| 6,760,186 B1 * | 7/2004 | Codilian et al. | ......... | 360/77.11 |
| 6,771,443 B1 * | 8/2004 | Szita et al. | .................... | 360/51 |

* cited by examiner

*Primary Examiner*—David Hudspeth
*Assistant Examiner*—Fred F. Tzeng
(74) *Attorney, Agent, or Firm*—Tejpal S. Hansra

(57) ABSTRACT

A method and apparatus for partial self-servo writing a disk surface in a disk drive using servo wedge propagation is provided. In one embodiment, servo information is written by a servo track writer near an outer diameter of the disk surface. The servo information is grouped into a 1× set of servo information and a 2× set of servo information. The disk drive's read head is used to read the 1× set of servo information in order to position the disk drive's write head to write servo information which is radially-aligned with the 2× set of servo information. Then, the disk drive's read head is used to read the 2× set of servo information in order to position the disk drive's write head to write servo information which is radially-aligned with the 1× set of servo information. The process is repeated on a track-by-track basis until servo information is written from the outer diameter of the disk surface to the inner diameter of the disk surface, as if it was entirely written by a servo track writer.

22 Claims, 6 Drawing Sheets

METHOD AND APPARATUS FOR PARTIAL SELF-SERVO WRITING USING SERVO WEDGE PROPAGATION

CROSS-REFERENCE TO RELATED APPLICATIONS

Priority is claimed from U.S. Provisional Patent Application Ser. No. 60/345,889 filed Nov. 9, 2001, which is incorporated herein by reference in its entirety.

FIELD OF THE INVENTION

The present invention relates to computer disk drives. More particularly, the present invention relates to partial self-servo writing.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 (having a write head and a read head) mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 31. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 32 via an input/output port 34. The disk drive 10 is used by the host computer 32 as a data storage device. The host 32 delivers data access requests to the disk drive 10 via port 34. In addition, port 34 is used to transfer customer data between the disk drive 10 and the host 32 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ in response to, among other things, an access command received from the host computer 32 via the interface 40.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 32 into a write current signal that is delivered to the transducer 20 to "write" the customer data to an appropriate portion of the disk 12. The read/write channel 38 is also operative for continually processing data read from servo information stored on the disk 12 and delivering the processed data to the controller 36 for use in, for example, transducer positioning.

FIG. 3 is a diagrammatic representation of a simplified top view of a disk 12 having a surface 42 which has been formatted to be used in conjunction with a sectored servo system (also known as an embedded servo system). As illustrated in FIG. 3, the disk 12 includes a plurality of concentric tracks 44a–44h for storing data on the disk's surface 42. Although FIG. 3 only shows a relatively small number of tracks (i.e., 8) for ease of illustration, it should be appreciated that typically tens of thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

During the disk drive manufacturing process, a special piece of equipment known as a servo track writer (STW) is used to write the radially-aligned servo information which forms servo wedges 50. A STW is a very precise piece of equipment that is capable of writing servo information on the disk surface with a high degree of positional accuracy. In general, a STW is a very expensive piece of capital equipment. Thus, it is generally desirable that a STW be used as efficiently as possible during manufacturing operations. Even a small reduction in the amount of data needed to be written by the STW per disk surface can result in a significant cost and time savings.

FIG. 4 depicts, in block diagram form, certain portions of a conventional servo track writer 56 and a disk drive 10. Only those components that are used to position the disk drive's actuator arm assembly 18 radially relative to the center of the disk surface are shown in FIG. 4. Among other things, the servo track writer 56 includes an STW digital signal processor (DSP) 58, a STW voice-coil motor (VCM) 60, a STW actuator arm assembly 62 and a push-pin system 64.

In order to write servo information on to a disk surface 12, the disk drive 10 is loaded onto the STW 56 and is held securely in place. One of a variety of push-pin systems 64 (e.g., a mechanical push-pin system or an optical push-pin system) is used to create an interface between the actuator arm assembly 18 of disk drive 10 and the actuator arm assembly 62 of the servo track writer 56. By properly positioning the STW actuator arm assembly 62, the actuator arm assembly 18 and, hence, the transducer 20 of the disk drive 10 may be positioned at an appropriate location relative to the center of the disk surface 12. In order to effectuate this positioning, the STW 56 uses a servo loop formed by an external relative encoder (see block 76 in FIG. 6), which cooperates with (or forms a part of) the STW VCM 60, and a compensation circuit (see block 76 in FIG. 6).

Once the transducer 20 is appropriately positioned relative to the disk surface 12, servo information is then written by the transducer 20 onto the disk surface 12 at the particular radial location. Subsequently, the STW actuator arm assembly 62 is used to position the actuator arm assembly 18 of the disk drive 10 at a next radial location and servo information is written at this radial location. The process repeats until servo information is written at all predetermined radial locations across the disk surface 12.

As shown in FIG. 4, the STW 56 also includes a crystal 66 and a divide-by-N circuit 68 which are used to provide a series of interrupt signals 70 (see FIG. 5) to the STW DSP 58 at predetermined sample times, $T_s$. Upon receipt of an interrupt signal 70, the STW DSP 58 performs an interrupt service routine (ISR) 72, which last for a duration generally less than the sample time, $T_s$, as indicated by the brackets shown in FIG. 5.

FIG. 6 depicts, in block diagram form, the steps of a conventional interrupt service routine. As shown in FIG. 6, the ISR broadly includes the steps of: profile generation (block 74), STW servo loop closure, whereby the generated profile is followed (block 76), and communication/housekeeping between the host computer 32 and the STW DSP 58 (block 78).

Because servo information is conventionally written by placing transducers at radial locations across the disk surface and then writing servo information which is used to define a track, the time for writing servo information increases as the total number of tracks able to be placed on a disk surface increases. Since the number of tracks per inch (TPI) continues to increase, manufacturing times are likely to continue to increase, unless more servo track writers are supplied. However, as alluded to above, the purchase of additional servo track writers involves a significant capital expense.

Accordingly, it would be beneficial to provide a technique for reducing the amount of time required by a STW while still allowing for servo information to be completely written onto a disk surface, so that manufacturing costs can be decreased and manufacturing throughput can be increased.

SUMMARY OF THE INVENTION

The present invention is designed to meet the aforementioned, and other, needs. The invention is directed to a method and apparatus for partial self-servo writing a disk surface in a disk drive using servo wedge propagation.

In one embodiment, servo information is written by a servo track writer near an outer diameter of the disk surface. The servo information is grouped into a 1× set of servo information and a 2× set of servo information. The disk drive's read head is used to read the 1× set of servo information in order to position the disk drive's write head to write servo information which is radially-aligned with the 2× set of servo information. Then, the disk drive's read head is used to read the 2× set of servo information in order to position the disk drive's write head to write servo information which is radially-aligned with the 1× set of servo information. The process is repeated on a track-by-track basis until servo information is written from the outer diameter of the disk surface to the inner diameter of the disk surface, as if it was entirely written by a servo track writer.

In another embodiment, a plurality of concentric rings of servo information are written onto the disk surface using a servo track writer; however, no servo information is written between the plurality of concentric rings by the servo track writer. The disk drive's write head is used to write servo information between the plurality of concentric rings.

Other embodiments, objects, features and advantages of the invention will be apparent from the following specification taken in conjunction with the following drawings.

DETAILED DESCRIPTION OF THE PREFERRED EMBODIMENT

Figure 1:
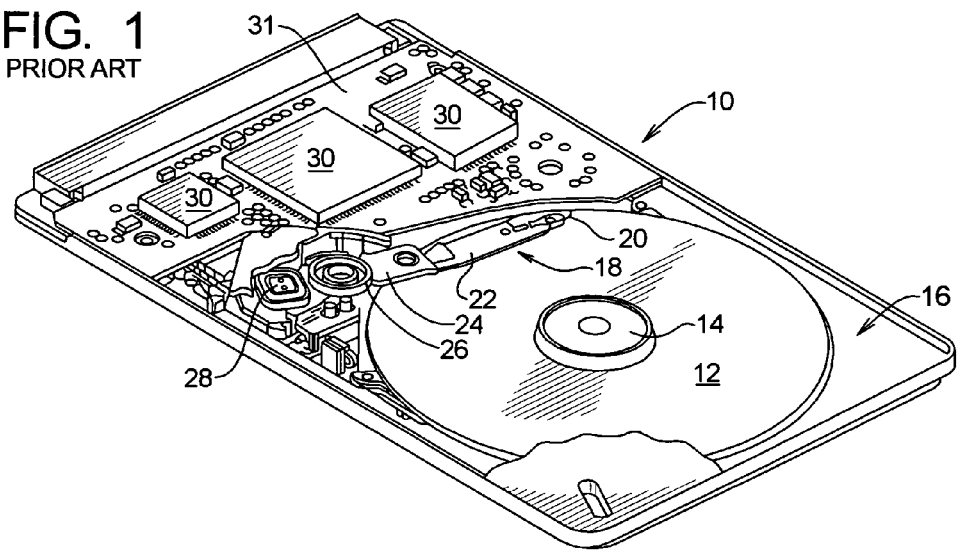
FIG. 1 is a diagrammatic representation illustrating a conventional disk drive with its top cover removed.
Figure 2:
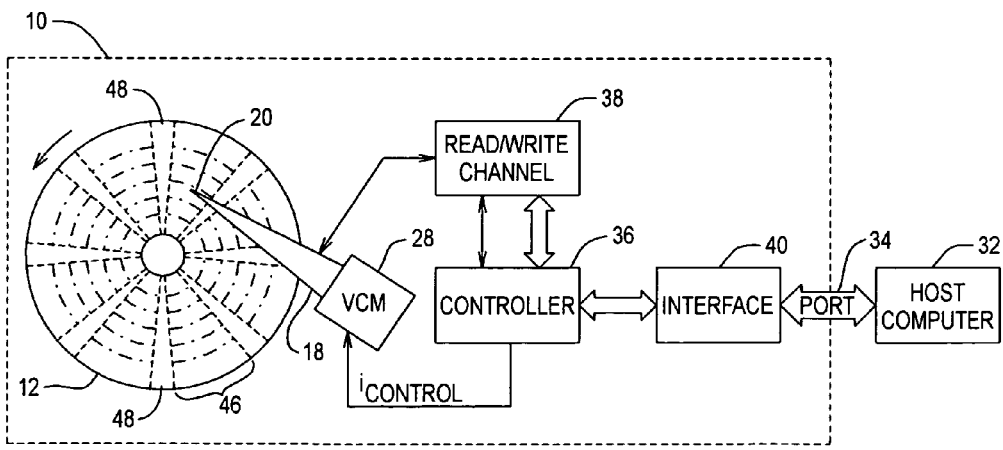
FIG. 2 is a functional block diagram which illustrates a conventional disk drive that is coupled to a host computer via an input/output port.
Figure 3:
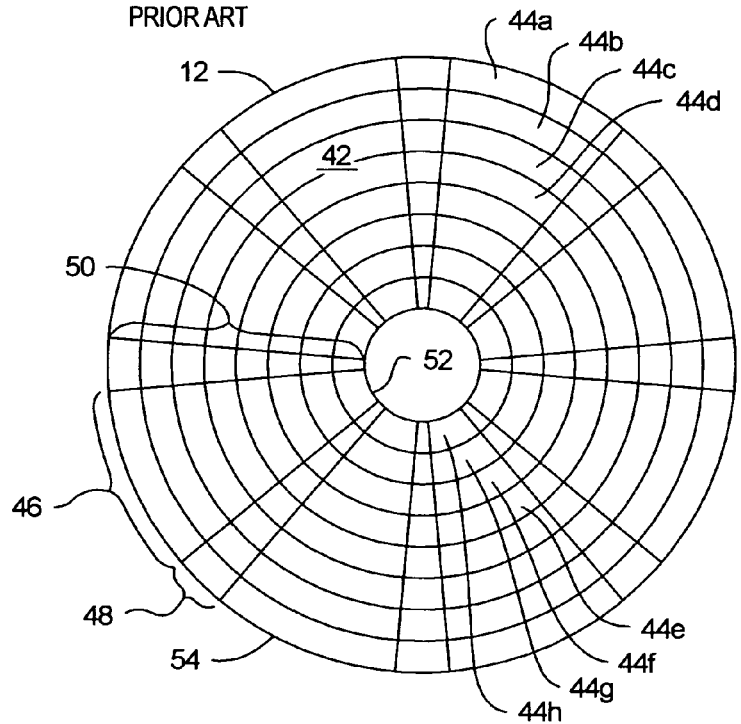
FIG. 3 is a diagrammatic representation of a top view of a magnetic storage disk illustrating a typical organization of data on the surface of the disk.
Figure 4:
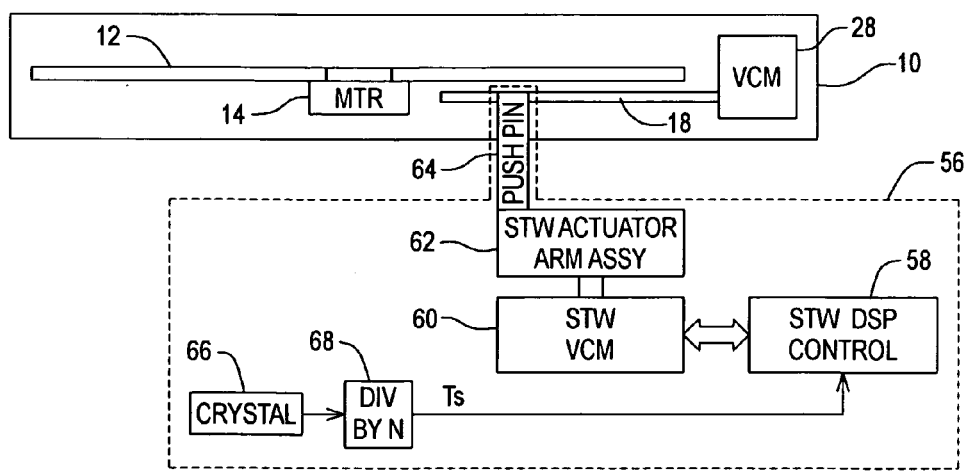
FIG. 4 is a block diagram illustrating portions of a conventional servo track writer (STW)
Figure 5:
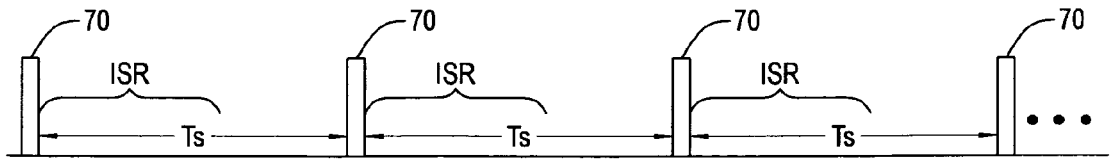
FIG. 5 is a diagrammatic representation illustrating a series of interrupt signals which occur at predetermined sample times, $T_s$.
Figure 6:
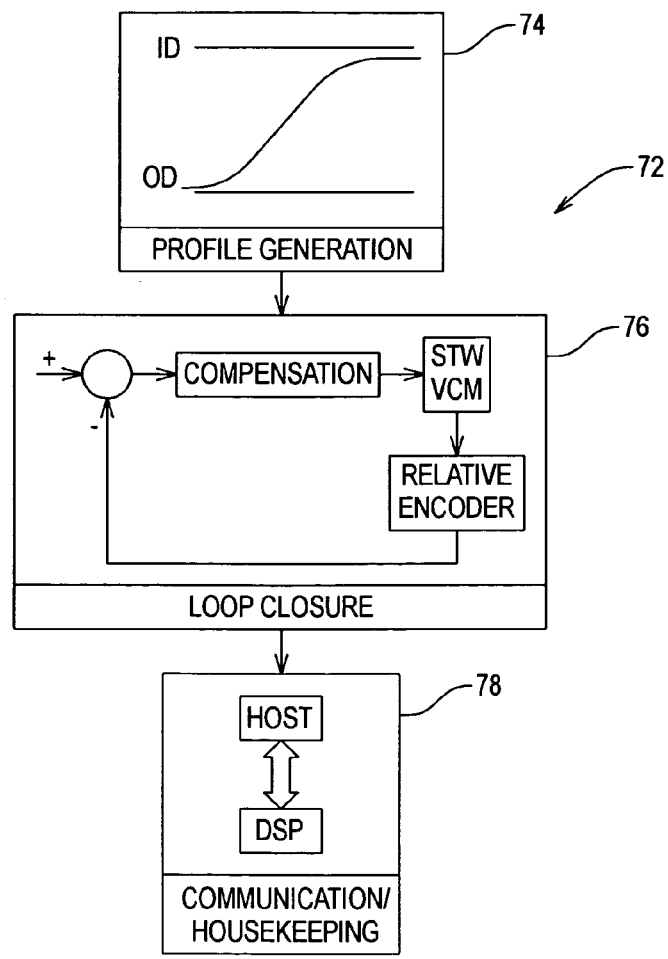
FIG. 6 is a block diagram illustrating a conventional interrupt service routine.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to partial self-servo writing using servo wedge propagation. In one embodiment, instead of writing all of the servo information (or servo wedges) onto a disk surface, the STW writes initial portions of the servo wedges, which correspond to a predetermined number of data tracks (e.g., about 500 to 1000 data tracks), near the outer diameter of the disk surface. This information is used by the disk drive itself to write the remaining portions of the servo wedges onto the disk surface. Advantageously, less time is used by the STW, which increases manufacturing throughput and reduces capital costs. Furthermore, a clean room environment is not required for the drive to perform its self-servo writing, since the disk drive is sealed prior to writing the remaining portions of the servo wedges.

Figure 7:
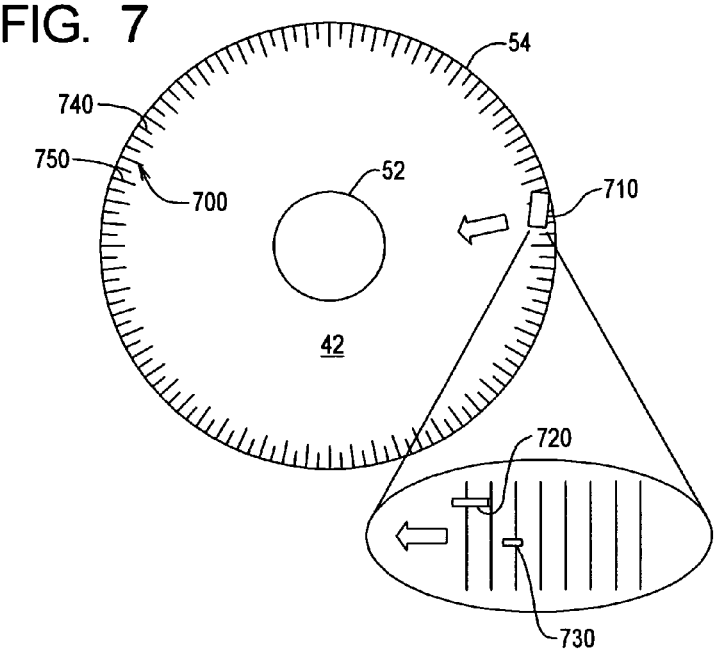
FIG. 7 is a diagrammatic representation of a disk surface having initial portions of servo wedges written at the outer diameter of the disk surface, along with a magnified representation of an air-bearing surface view of a slider having a writer radially offset from a reader, which are used in conjunction with the present invention; and, FIGS. 8–11 illustrate the process of writing the remaining portions of the servo wedges from the initial portions of the servo wedges in accordance with the present invention; and, FIG. 12 illustrates another embodiment of the invention showing concentric rings of servo wedges, which have been written by the STW at various radii in order to reduce error propagation.

Reference is now made to FIG. 7, which illustrates initial portions of servo wedges 700 that have been written by a STW near the outer diameter of disk surface 42. This servo information is used by the disk drive to write the remaining portions of the servo wedges onto the disk surface. The servo information written by the STW provides both radial position information, as well as, circumferential timing information. The servo wedge propagation process of the present invention faithfully reproduces both timing and position information from the initial portions of servo wedges written by the STW.

In order to write the remaining portions of the servo wedges onto the disk surface, the initial portions of the servo wedges are read and additional portions of the servo wedges are written adjacent to the initial portions of the servo wedges, so that the servo wedges are "fill-in" towards the inner diameter of the disk surface. The additional portions of the servo wedges are used to write further portions of the servo wedges that are located further towards the inner diameter of the disk surface, until the remaining portions of the servo wedges have been completed.

FIG. 7 also shows a magnified air-bearing surface view of a slider 710 having a writer (or write head 720) and a reader (or read head 730). The initial portions of the servo wedges 700 are read by read head 730 and additional portions of the servo wedges are written by the write head 720. In order to write the additional portions of the servo wedges towards the inner diameter 52 of the disk surface 42, the write head must be offset towards the center of the disk (i.e., in the radial direction) relative to the read head, as shown in the magnified portion of FIG. 7. Even further, the write head should be offset towards the center of the disk relative to the read head for all tracks on the disk surface when accounting for skew angle, as will be understood by those skilled in the art.

Due to limitations of the channel, it is impossible to read and write at the same time. Accordingly, groupings may be formed of the servo wedges. For example, circumferentially-adjacent servo wedges can be considered to be in differing groups. In FIG. 7, two groups of servo wedges are shown. For convenience sake, one group of servo wedges are termed 1× servo wedges 740 (shown as the smaller hash marks that extend toward the center of the disk in FIG. 7) and the other group of servo wedges are termed 2× servo wedges 750 (shown as the longer hash marks that extend toward the center of the disk in FIG. 7). It should be understood that the radial length of the 1× and 2× servo wedges 740, 750 are preferably (but not necessarily) identical and that the hash marks have different sizes for illustrative purposes only.

Portions of the 1× servo wedges 740 are read by the reader and used to write portions of the 2× servo wedges 750. Then, portions of the 2× servo wedges 750 are read by the reader and used to write portions of the 1× servo wedges 740. Reference is made to FIGS. 8–11 to illustrate this concept.

Figure 8:
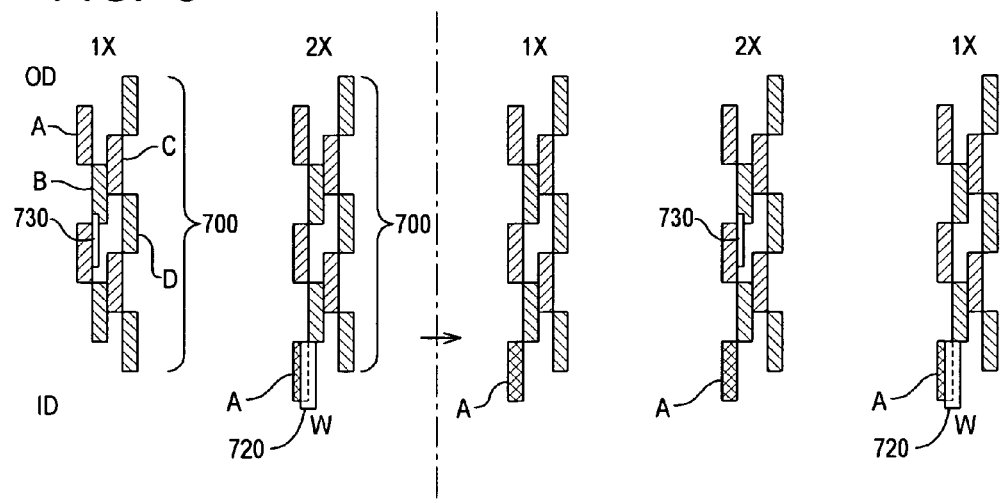

With reference to FIG. 8, initial portions of servo wedges 700 include repeating sets of A, B, C and D servo bursts, as is well-known in the art. The initial portions of servo wedges 700 are shown with a first type of cross-hatching in FIG. 8. The read head 730 is positioned over the 1× servo wedge on the left side of the figure using the 1× set of servo bursts (i.e., a servo operation is performed), so that the write head 720 may be used to write the next burst in the 2× servo wedge, which is shown with a second type of cross-hatching on the left side of the figure and is an A servo burst. Preferably, 1× servo wedges that are circumferentially-adjacent to the 2× servo wedges (and visa-versa) are used to write the next burst.

Once the next servo burst (in the case of FIG. 8 the A servo burst) has been written to the 2× servo wedges by performing a servo operation on the 1× servo wedges, then a servo operation is performed on the 2× servo wedges to write the next servo burst for the 1× servo wedges. For example, the read head 730 is positioned over the 2× servo wedge on the right side of FIG. 8 using the 2× set of servo bursts (i.e., a servo operation is performed), so that the write head 720 may be used to write the next burst in the 1× servo wedge, which is shown with the second type of cross-hatching on the right side of the figure and is an A servo burst.

Because the read head 730 is used to position the write head 720 at the location of where the next burst should be written and because all read heads and write heads are not offset the same distance, the initial portions of the servo wedges 700 may be used to perform a calibration to determine the reader-to-writer offset. Such calibration processes are well-known in the art and will not be described herein.

It is important, however, that the reader-to-writer offset be known prior to writing the remaining portions of the servo wedges, so that such information is written at the proper locations. As will be understood by those skilled in the art, the effective offset will change based upon skew angle, which can be calculated using well-known techniques.

It should also be noted that, in many disk drives, the write head 720 has a width that is larger than the read head 730. Since the write head 720 is used to write servo bursts A, B, C, D and since it is desirable that such servo bursts be approximately equal to the width of the read head 730, a burst trimming operation may be performed. Trimming operations are well-known to those skilled in the art.

For example, in the case of a read head 730 having a width that is 66% of the write head 720, the writer 720 is positioned so that ⅓ of a previously-written burst (i.e., a burst that has been previously-written by the writer 720) is trimmed. Other ratios are possible based upon the relative widths between the read head 730 and the write head 720.

Figure 9:
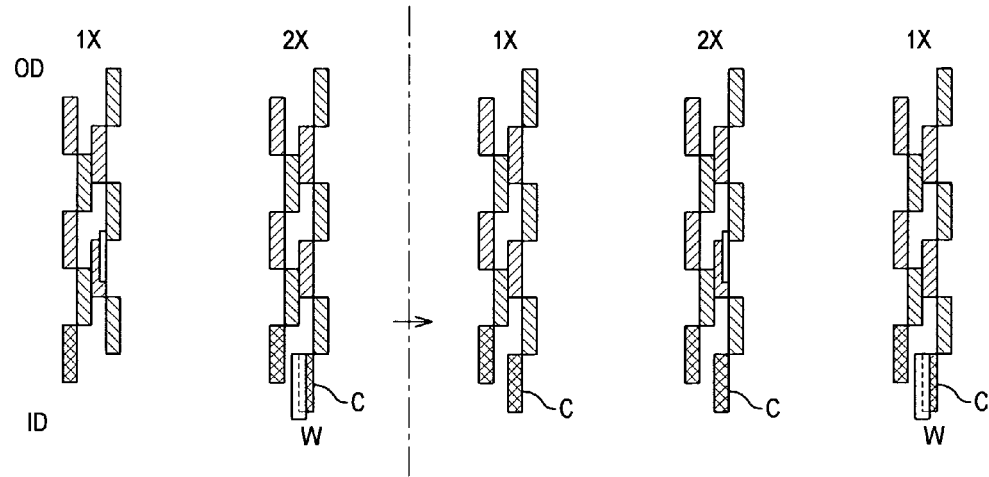
Figure 10:
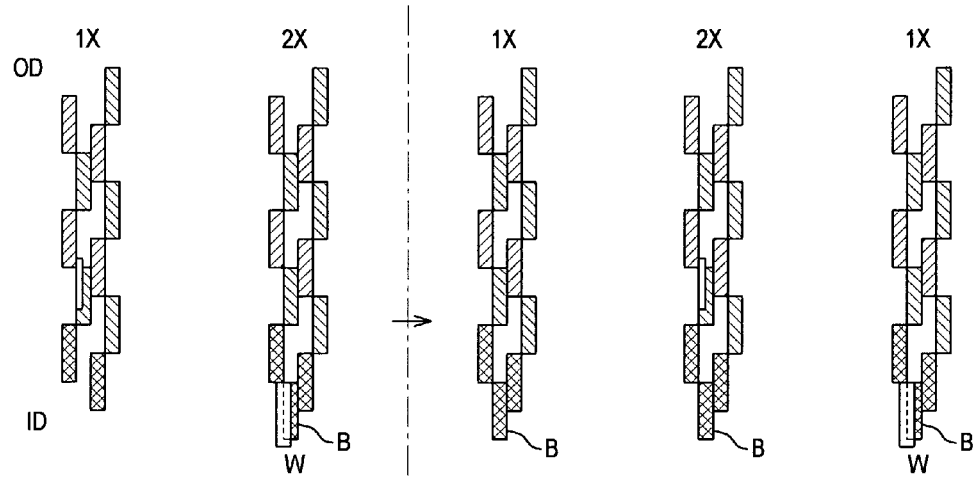
Figure 11:
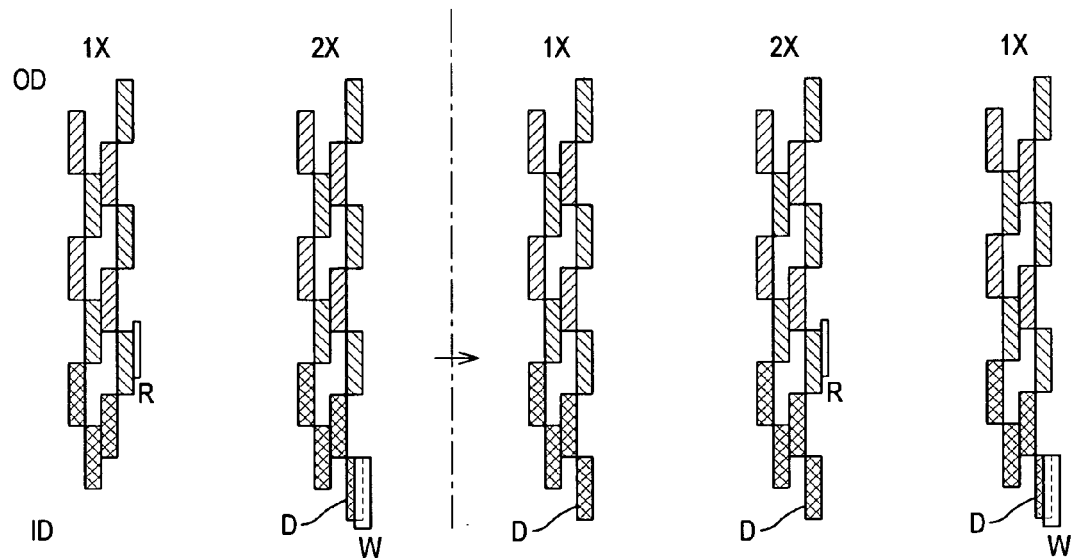

The manner of writing additional bursts, similar to that described in connection with FIG. 8, is shown in FIGS. 9–11. Specifically, C bursts are written in FIG. 9, while B and D bursts are written in FIGS. 10 and 11, respectively. It should be noted that the present invention is not limited to the depicted order of writing the servo bursts. When the process has been completed, the disk surface is formatted as if it was written by a STW.

Figure 12:
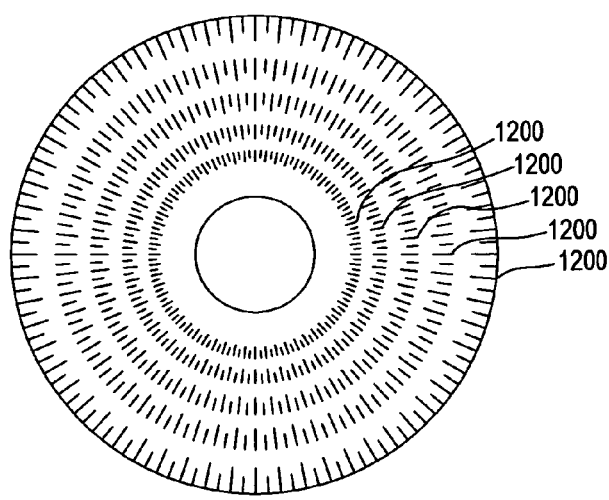

Another embodiment of the present invention is shown in FIG. 12. Instead of the STW writing initial portions of servo wedges 700 only at the outer diameter of the disk surface, the STW writes concentric rings of servo wedges 1200 as shown in FIG. 12. The concentric rings of servo wedges 1200 are used to recalibrate the wedge propagation self-servo writing process.

Specifically, in order to contain any error propagation or to handle locations which contain media defects such that the wedge propagation process becomes disrupted, concentric rings of servo wedges 1200 are written by the STW at predetermined radial locations on the disk surface. For example, the concentric rings of servo wedges 1200 may be spaced 1000 tracks apart.

In the embodiment of FIG. 12, the wedge propagation technique would be similar to that shown with respect to FIGS. 8–11. However, at each of the concentric rings of the servo wedges 1200, the system would be, in effect, recalibrated. Accordingly, servo wedge propagation using the read head 730 and write head 720 would be based upon the concentric ring of servo wedges 1200 lying immediately radially outwardly from the portions of servo wedges being written (that is, in situations where servo wedges are being written from the disk surface's outer diameter towards its inner diameter).

It should be understood that the present invention is not limited to writing servo wedges from the outer diameter of the disk surface to the inner diameter of the disk surface. Instead, initial portions of the servo wedges may be written near the inner diameter of the disk surface and wedge propagation may occur radially outwardly. Likewise, the servo wedges may be written from the inner diameter to the outer diameter when using concentric rings of servo wedges.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface having a read head and a write head associated therewith;
   writing a plurality of concentric rings of servo information onto the disk surface using a servo track writer, wherein no servo information is written between the plurality of concentric rings by the servo track writer; and,
   writing servo information between the plurality of concentric rings using the write head associated with the disk surface.

2. The method of claim 1, wherein the concentric rings of servo information are spaced about 1000 tracks apart.

3. The method of claim 1, wherein the plurality of concentric rings of servo information each include groups of a 1× set of servo information and a 2× set of servo information; and,
   reading servo information from said 1× set of servo information using the read head in order to position the write head to write servo information which is radially-aligned with the 2× set of servo information.

4. The method of claim 3 including the step of:
   reading servo information from said 2× set of servo information using the read head in order to position the write head to write servo information which is radially-aligned with the 1× set of servo information.

5. The method of claim 3 including the step of:
   writing a complete track of servo information which is radially-aligned with the 2× set of servo information by reading the 1× set of servo information.

6. The method of claim 5 including the step of:
   subsequently writing a complete track of servo information which is radially-aligned with the 1× set of servo information by reading the 2× set of servo information.

7. The method of claim 1, wherein the read head and the write head are radially offset from one another.

8. The method of claim 7, wherein the disk surface has an inner diameter and wherein the write head is radially offset towards the inner diameter of the disk surface relative to the read head.

9. The method of claim 7, further including the step of performing a calibration to determine the radial offset between the read head and the write head using the servo information written by the servo track writer.

10. The method of claim 1, wherein about 500 tracks of servo information are written by the servo track writer.

11. An apparatus comprising:
    a disk surface having a plurality of concentric rings of servo information written thereon by a servo track writer, wherein no servo information is written between the plurality of concentric rings by the servo track writer; and,
    a read head and a write head associated with the disk surface, wherein the write head is used to write servo information between the plurality of concentric rings.

12. The apparatus of claim 11, wherein concentric rings of servo information are spaced about 1000 tracks apart.

13. The apparatus of claim 11, wherein the plurality of concentric rings of servo information each include groups of a 1× set of servo information and a 2× set of servo information; and,
wherein the read head reads servo information from said 1× set of servo information in order to position the write head to write servo information which is radially-aligned with the 2× set of servo information.

14. The apparatus of claim 13 wherein the read head is used to read servo information from said 2× set of servo information in order to position the write head to write servo information which is radially-aligned with the 1× set of servo information.

15. The apparatus of claim 13 wherein the write head writes a complete track of servo information which is radially-aligned with the 2× set of servo information by using the read head to read the 1× set of servo information.

16. The apparatus of claim 15 wherein the write head subsequently writes a complete track of servo information which is radially-aligned with the 1× set of servo information by using the read head to read the 2× set of servo information.

17. The apparatus of claim 11, wherein the read head and the write head are radially offset from one another.

18. The apparatus of claim 17, wherein the disk surface has an inner diameter and wherein the write head is radially offset towards the inner diameter of the disk surface relative to the read head.

19. The apparatus of claim 17, wherein a calibration is performed to determine the radial offset between the read head and the write head using the servo information written by the servo track writer.

20. The apparatus of claim 11, wherein about 500 tracks of servo information are written by the servo track writer.

21. A method comprising the steps of:
providing a disk surface having a read head and a write head associated therewith;
writing a plurality of concentric rings of servo information onto the disk surface using a servo track writer, said servo information including servo bursts, wherein no servo bursts are written between the plurality of concentric rings by the servo track writer; and,
writing servo information between the plurality of concentric rings using the write head associated with the disk surface.

22. An apparatus comprising:
a disk surface having a plurality of concentric rings of servo information written thereon by a servo track writer, the servo information including servo bursts, wherein no servo bursts are written between the plurality of concentric rings by the servo track writer; and,
a read head and a write head associated with the disk surface, wherein the write head is used to write servo information between the plurality of concentric rings.

* * * * *